Feb. 27, 1934.　　　　G. DECKER　　　　1,949,370
APPARATUS FOR HAIR WAVING
Filed March 15, 1929　　3 Sheets-Sheet 1

INVENTOR.
George Decker
BY
Harvey R. Hawgood
ATTORNEY.

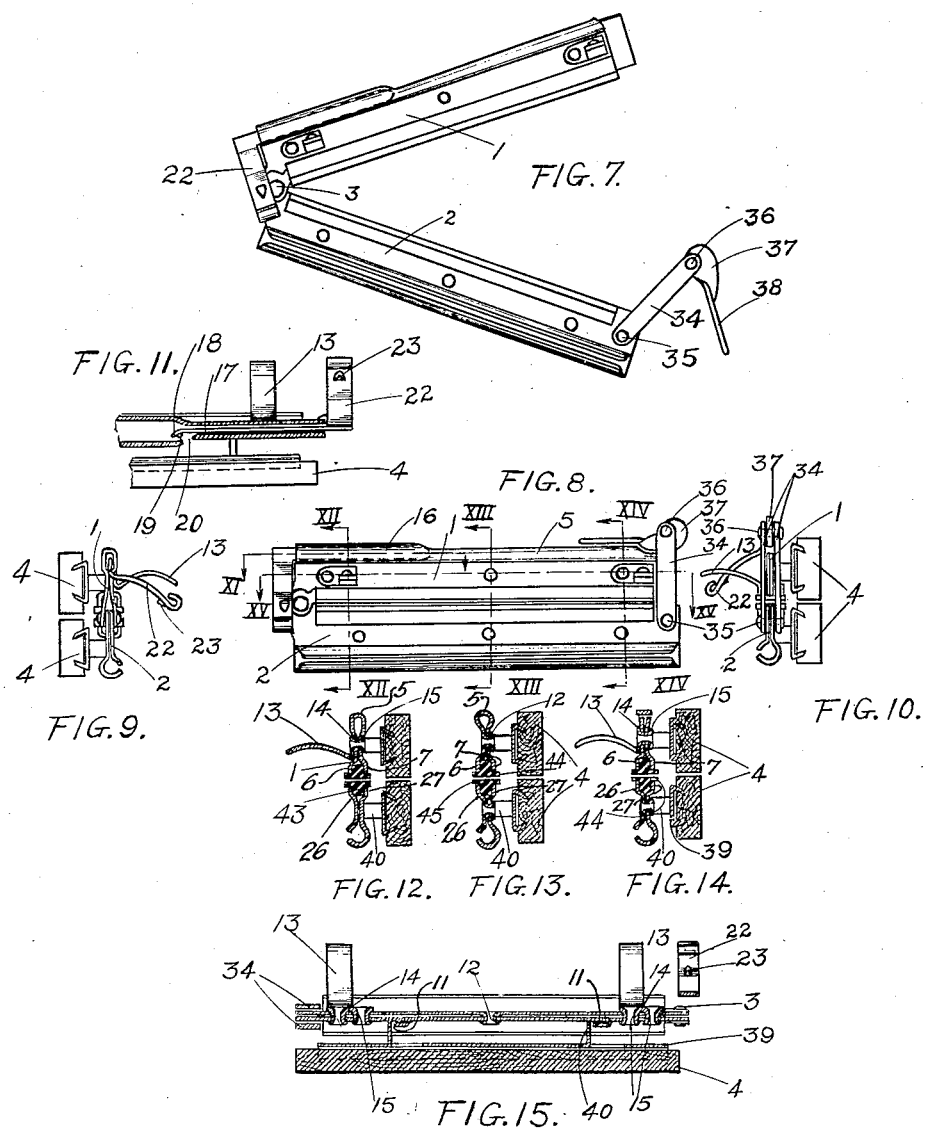

Feb. 27, 1934.   G. DECKER   1,949,370
APPARATUS FOR HAIR WAVING
Filed March 15, 1929   3 Sheets-Sheet 3

INVENTOR.
George Decker
BY Harvey R. Hawgood
ATTORNEY.

Patented Feb. 27, 1934

1,949,370

UNITED STATES PATENT OFFICE 1,949,370

APPARATUS FOR HAIR WAVING

George Decker, Cleveland, Ohio, assignor to The Philad Company, Cleveland, Ohio, a corporation of Ohio Application March 15, 1929. Serial No. 347,324

12 Claims. (Cl. 132—33)

This invention relates to the waving of hair upon the human head and more particularly to means for retaining a strand of hair and holding it in coiled position during a waving process.

An object of the invention is to provide improved means for retaining a strand of hair which will effectively protect the head of the subject receiving a wave.

Another object is to provide improved hair retaining means which may be easily manufactured and operated.

Another object is to provide improved hair retaining means which will permit waving the hair very close to the scalp of the subject.

Other objects will hereinafter appear.

The invention will be better understood from the description of one practical embodiment thereof, illustrated in the accompanying drawings, in which;

Figure 7 and Figure 8 are plan views of the clamp alone in open and closed positions, respectively;

Figures 9 and 10 are end elevations of the clamp in the position of Figure 8;

Figure 16:
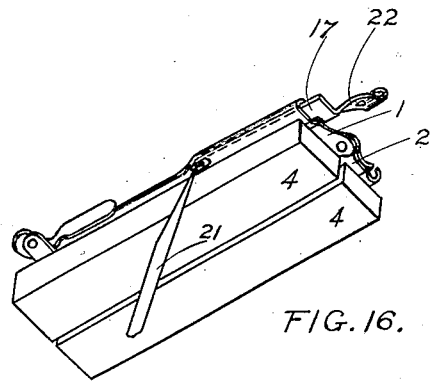
Figure 23:
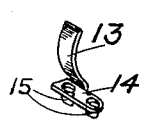

Figures 11, 12, 13, 14, and 15 are sectional views taken, respectively, on lines XI—XI, XII—XII, XIII—XIII, XIV—XIV, and XV—XV of Figure 8;

Figure 16 is a perspective view of the clamp showing the manner of removing the ratchet spring; and Figures 17 to 26 are perspective views of component parts of the clamp.

The clamp shown consists of two arms 1 and 2 of metal or like stiff material pivoted together at one end by a rivet 3 and having a detachable latching or locking means for retaining their unpivoted ends together. Each arm carries spaced below it a bar 4 of heat-insulating material, a material which has been found to be particularly well suited for this purpose being balsa wood.

Figure 17:
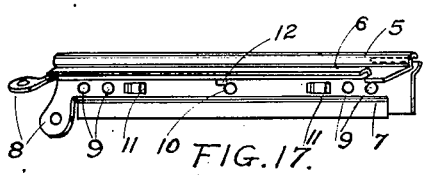
Figure 25:
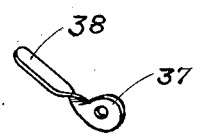
Figure 18:
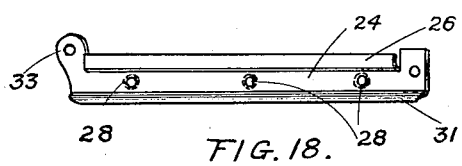
Figure 24:
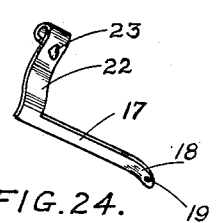
Figure 19:
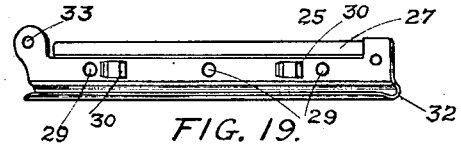
Figure 26:
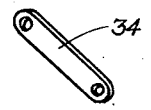
Figure 20:
Figure 21:
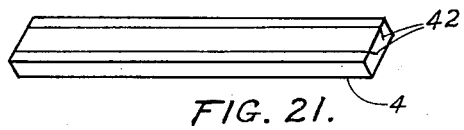

The arm 1 is made, as best shown in Figure 17, of a piece of sheet metal folded longitudinally upon itself, the fold forming a tubular rib 5 along the outer edge of the arm. The edges of the sheet, which form the inner edge of the arm, are offset at 6 and 7 so that they form, when the sheet is folded, a channel-shaped recess for the reception of a sealing strip to be hereinafter described. The corners of the sheet at one end are formed into perforated lugs 8 to be engaged by the pivot 3.

Adjacent each end and on each half of arm 1 is a pair of perforations 9 through which tubular rivet like projections on the curler rod supporting members may pass. One half of the arm is centrally perforated at 10 and slotted at 11, the slots being for the reception of lugs upon a holder for bar 4, and the other half of the arm is pierced at 12 to provide a small flange which will extend through perforation 10 and may be riveted over to hold the halves of the arm together. The use of tubular flanges of this type avoids the necessity of separate rivets or the like, lightening the apparatus, and provide ventilating holes through the arms through which air may circulate to cool the arms.

The curler rod supporting members or cradles each consist of a curved arm or cradle proper 13 and a base or attaching portion 14 integral therewith, the latter being pierced at two places to provide flanges 15 which pass through perforations 9 and are expanded or riveted over to hold the cradles to the arm 1 and to hold the halves of the arm together.

After the halves of the arm 1 have been folded upon each other, the tubular web 5 is flattened at 16 for a portion of its length to serve as a guide for the ratchet spring or pawl. The ratchet spring consists of an L-shaped piece of spring metal, such as spring steel, which is preferably tempered. One leg of the spring, 17, is flat and may slide in guide 16, this leg terminating in a downwardly bent end 18 having a detent 19 struck therefrom. This detent engages a stop consisting of the edge of a perforation 20 through the arm 1 at the end of the guide 16, as shown in Figures 11 and 16. The spring may be inserted in the guide by merely pressing it into the same, the detent springing into retaining position when it clears the perforation 20. To remove the spring, any implement 21 may be used to press the end 18 up until the detent enters the guide and the spring may be easily pulled out. The other leg 22 of the spring curves upwardly to overlie the curler rod, and has a detent or pawl tooth 23 struck out to engage the rod.

The arm 2 consists of two pieces 24 and 25, these formed very much as are the halves of arm 1. They have offset portion 26 and 27 to form a channel to receive a sealing strip at the inner edge of the arm, this strip cooperating with the one on arm 1. Piece 24 is pierced at three places to provide depending flanges 28 and piece 25 has three corresponding perforations 29 through which these may extend, the flanges being riveted over to secure the two pieces together. Piece 25 is slotted at 30 to receive the lugs on the holder for bar 4. A curved flange 31 extends along the outer edge of piece 24 and, with a more extensive curved flange 32 along the outer edge of piece 25, forms a channel-like retainer for receiving and retaining the edge of a pad for covering the strand of hair during the waving operation. The ends of pieces 24 and 25 constitute perforated lugs which receive the pivot 3.

The latching or locking device by which the arms are held together consists of two links 34 which are pivoted at one end to arm 2 by a rivet 35 and are arranged to embrace the end of arm 1. Pivoted between the free ends of the links by a rivet 36 is an eccentric or cam shaped locking member 37 having a handle 38, the rotation of which causes the locking member to bear upon the outer edge of arm 1 and press the arms together.

The holders by which bars 4 are attached to the arms each consist of a channel-shaped piece of metal or the like having a web 39 from which are struck two lugs 40, bent into L-shape, to be received in slots 11 or 30. The flanges 41 of the holder converge so that the channel defines a dove-tail shaped recess. The bars 4 each have two converging slots 42 to receive the flanges 41, the holder and bar being assembled by sliding the flanges endwise into the slots. The holders provide air spaces between the arms and bars, the spaces being spanned only by the lugs 40, and thus effectively insulate them against the transmission of heat.

Figure 22:

The sealing strips are as best shown in Figure 22, and each consists of a strip 43 which is frictionally held in the channel in the inner edge of one of the arms of the clamp. This strip, on its projecting edge, has a depending flange 44 and an upwardly extending flange 45, these overlying the edges of the metal of the clamp and protecting the hair from contact with the same. The flange 45 has its edge beveled at 46 to prevent too abrupt a bend being given the hair at this point. These strips are of any desired heat resisting resilient material, most conveniently being of rubber, and are easily removed or replaced.

Figure 1:
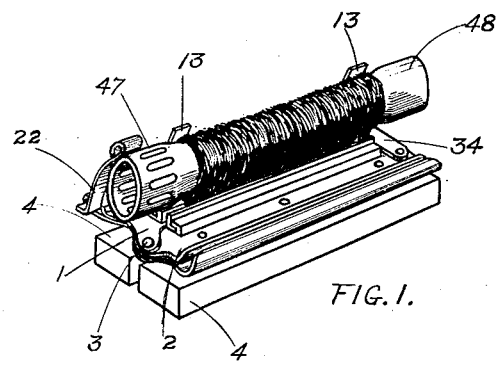
Figure 1 is a perspective view of a clamp and curler rod applied to a strand of hair.
Figure 2:
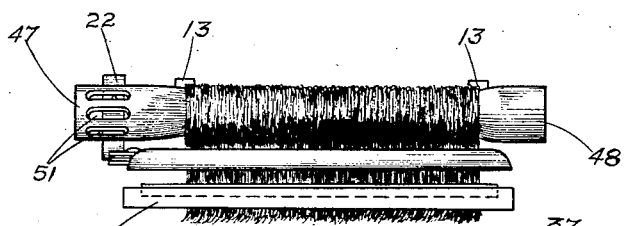
Figure 2 is a side elevation of the apparatus of Figure 1.
Figures 3, 4:
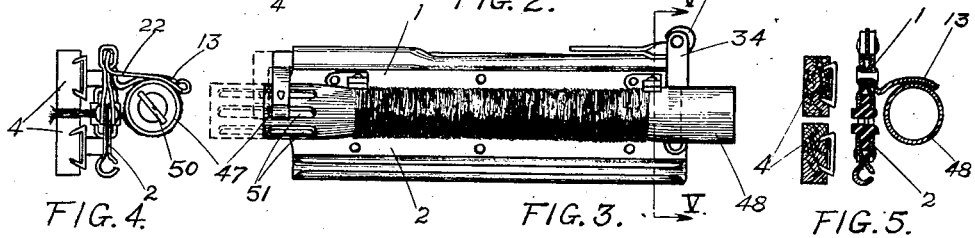
Figure 3 is a plan view thereof.
Figure 4 is an end elevation of the apparatus of the preceding figures.
Figure 5:
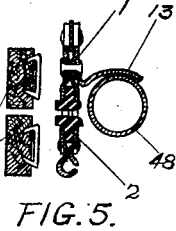
Figure 5 is a cross sectional view taken on line V—V of Figure 3.
Figure 6:
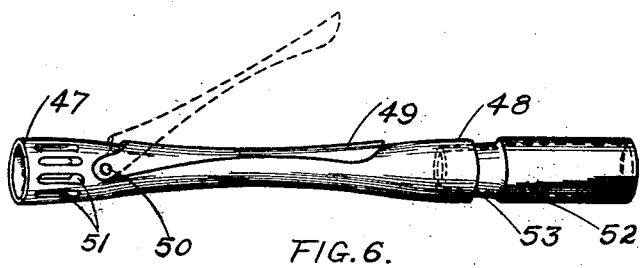
Figure 6 is a perspective view of the curler rod with a detachable extension used in some waving operations.

The curler rod shown is tubular, having cylindrical ends 47 and 48, and decreasing in diameter from these ends to its middle. A tongue 49 is pivoted to the rod near end 47 by a rivet 50, so that the ends of a strand of hair may be held between the tongue and rod and the hair wound spirally, one turn over another, about both rod and tongue. End 47 is provided with a plurality of axially extending slots 51 which constitute a ratchet to be engaged by the spring above described. These slots are relatively long, and as the spring may engage any part of a slot and may itself slide in arm 1, the position of the rod relative to the clamp may vary considerably without impairing the action of the ratchet, as indicated in dotted lines in Figure 3, so that when the operator winds a strand of hair nearer to either end of the rod than usual, the winding need not be done over and much wasted time is saved.

After the hair has been wound tightly upon the rod and this has been placed against the cradles and under the ratchet spring the rivet 50 may be engaged by a tool having a slotted end and the rod rotated to further stress the hair, the ratchet operating to retain the rod in adjusted position.

A tubular extension 52, having a reduced end 53 which may be inserted within end 48 of the curler rod and frictionally held therein, is provided for use with strands of unusually long hair or when it is desired to wind all or part of a strand or a part of a strand helically instead of spirally, the extension being removed when not needed.

While I have described the illustrated embodiment of my invention in some particularity, this is done by way of illustration only, and I do not limit myself to the details shown and described but claim as my invention all embodiments coming within the scope of the subjoined claims.

I claim:

1. In combination, a clamp engaging a strand of hair near its roots, a resilient pawl slidably carried thereby, and a curler rod having an elongated ratchet cooperating with said pawl.

2. In combination, a clamp engaging a strand of hair near its roots, a pawl carried thereby and being of L shape with one leg slidable in a tubular part of said clamp, a detent on the end of said leg, an aperture in said clamp giving access to said detent and serving as a stop therefor, and a curler rod having a ratchet cooperating with said pawl.

3. In combination, a hair retaining clamp having elongated pivoted arms between which a strand of hair may be clamped, a curler rod having a ratchet adjacent one end, a pawl carried by one of said arms to engage said ratchet, and cradles upon one of said arms engaged by the rod when held by the ratchet and maintaining it substantially parallel to the arms and above the center of the clamp.

4. In combination, a hair retaining clamp having elongated pivoted arms between which a strand of hair may be clamped, a curler rod having a ratchet adjacent one end comprising a plurality of elongated slots, a resilient pawl carried by one of said arms and slidable longitudinally thereof, and cradles carried by one of said arms adjacent its ends and engaging said rod to prevent lateral movement thereof.

5. A clamp comprising two elongated arms pivoted together at one end, a catch for securing their other ends together, connectors depending from each arm, a channel shaped holder having converging sides carried by the connectors of each arm, and a bar of heat insulating material having slots in its side toward the arm embracing the sides of the holder.

6. A clamp comprising two elongated arms pivoted together at one end, a catch for securing their other ends together, connectors depending from each arm, a channel shaped holder having converging sides carried by the connectors of each arm, the connectors and arms being spaced apart to provide substantial air spaces therebetween, and a bar of heat insulating material having slots in its side toward the arm embracing the sides of the holder.

7. A clamp comprising two elongated arms pivotally connected at one end and detachably connected at the other, a channel shaped recess in the meeting edge of each, a resilient strip in each recess and having a flanged edge projecting therefrom the flanges of which overlie the edges of the channel, an upwardly opening channel in the outer edge of one of the arms for the reception and retention of the edge of a hair covering pad, and a bar of heat insulating material carried by each arm and spaced therefrom.

8. A clamp comprising two elongated arms pivotally connected at one end and detachably connected at the other, the adjacent edges of each arm being formed into channel-shaped recesses, a resilient strip in each recess and having an edge extending therefrom, and flanges on said edge of the strip overlying said adjacent edges of the arms.

9. A clamp comprising two elongated arms pivotally connected at one end and detachably connected at the other, the adjacent edges of each arm being formed into channel-shaped recesses, a resilient strip in each recess and having an edge extending therefrom, and flanges on said edge of the strip overlying said adjacent edges of the arms, one of said flanges being bevelled.

10. A clamp comprising two elongated arms pivotally connected at one end and detachably connected at the other, the adjacent edges of each arm being formed into channel-shaped recesses, a resilient strip in each recess and having an edge extending therefrom, flanges on said edge of the strip overlying said adjacent edges of the arms, and a bar of heat insulating material carried by each arm and spaced therefrom.

11. In combination, a hair retaining clamp having pivoted arms between which a strand of hair may be clamped, a curler rod, a ratchet upon the rod adjacent one end thereof, a pawl carried on one of said arms to engage the ratchet, and upwardly extending bearing members upon one of said arms to engage one side of said rod to locate the same.

12. A curler rod of generally spool-shaped configuration having a hollowed end, an extension of substantially the same external diameter as the end of the rod, and having a reduced portion fitting within and frictionally engaging the hollow end of the rod.

GEORGE DECKER.